United States Patent [19]

Whitney

[11] Patent Number: 4,764,051
[45] Date of Patent: Aug. 16, 1988

[54] ROAD HAVING CURVED GROOVES

[76] Inventor: James R. Whitney, 18332 Sharon Rd., Triangle, Va. 22172

[21] Appl. No.: 75,399

[22] Filed: Jul. 20, 1987

[51] Int. Cl.⁴ .................. E01C 23/16; E01C 11/22
[52] U.S. Cl. .......................... 404/16; 404/2; 404/72; 404/75; 404/94; 404/98; 404/112; 299/40; 299/41; 116/63 R
[58] Field of Search .................. 404/9, 12, 14–16, 404/17, 72, 75, 90, 93, 94, 96, 112, 122, 2, 4, 7, 98; 299/36, 39, 40, 41, 86, 88; 116/63 R

[56] References Cited

U.S. PATENT DOCUMENTS

| | | | |
|---|---|---|---|
| 2,330,808 | 10/1943 | Bingham | 404/16 |
| 2,826,128 | 3/1958 | Summers | 404/12 |
| 2,862,427 | 12/1958 | Talbott | 404/112 |
| 3,407,005 | 10/1968 | Simms et al. | 299/39 |
| 3,529,517 | 9/1970 | Liddle et al. | 404/72 X |
| 3,801,211 | 4/1974 | Perkins | 404/75 |
| 3,868,146 | 2/1975 | Ellis | 299/39 |
| 4,575,278 | 3/1986 | Whitney | 404/72 |
| 4,634,188 | 1/1987 | Persson | 299/40 X |
| 4,701,069 | 10/1987 | Whitney | 404/16 X |

FOREIGN PATENT DOCUMENTS 133961 3/1985 European Pat. Off. .............. 404/90

Primary Examiner—Jerome Massie
Assistant Examiner—John F. Letchford
Attorney, Agent, or Firm—Thomas J. Greer, Jr.

[57] ABSTRACT

An apparatus and method for cutting grooves on the edges of an already formed road. Each of a plurality of toothed cutting wheels revolves about a substantially vertical driving shaft. Simultaneously, each cutting wheel (attached to a respective rotary shaft) revolves about its own longitudinal and substantially horizontal axis. The apparatus is moved along a road, near an edge thereof, thus giving rise to one linear motion and two rotary motions. Sequentially, each cutting wheel enters an edge of the road from a region beyond the road edge, due to a slight tilt of the plane which contains the cutting wheel rotary shafts. The resultant grooves are deepest at the road edges and then gradually diminish to zero depth, the grooves being arcuate and parallel to each other. With the plane containing the cutting wheel shafts completely horizontal, the apparatus can cut rain drainage grooves in a raised marking strip on the road or can remove bumps from the road.

9 Claims, 5 Drawing Sheets

FIG. 5
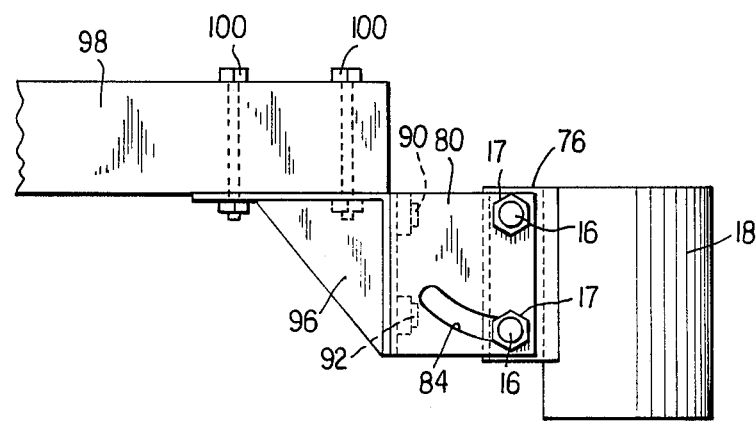
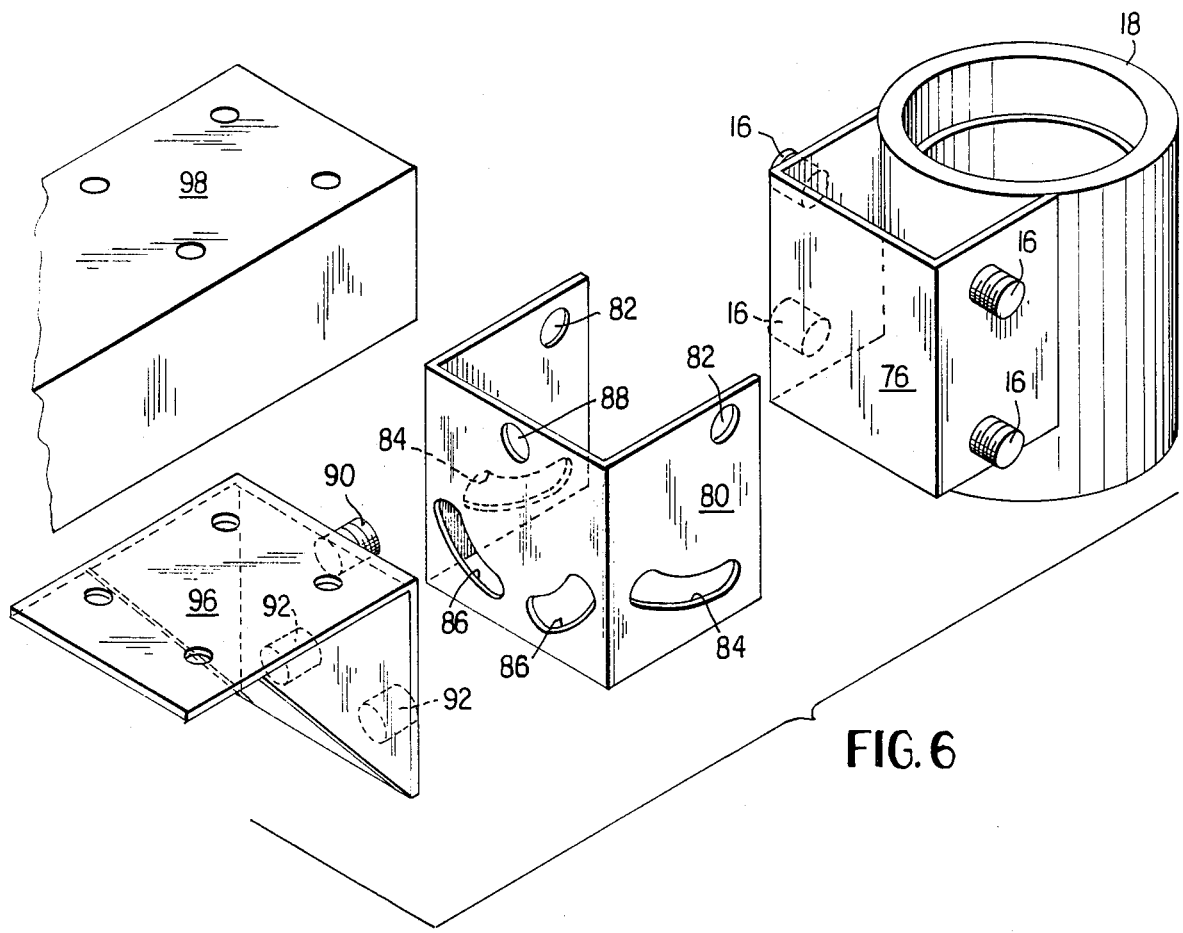
FIG. 6

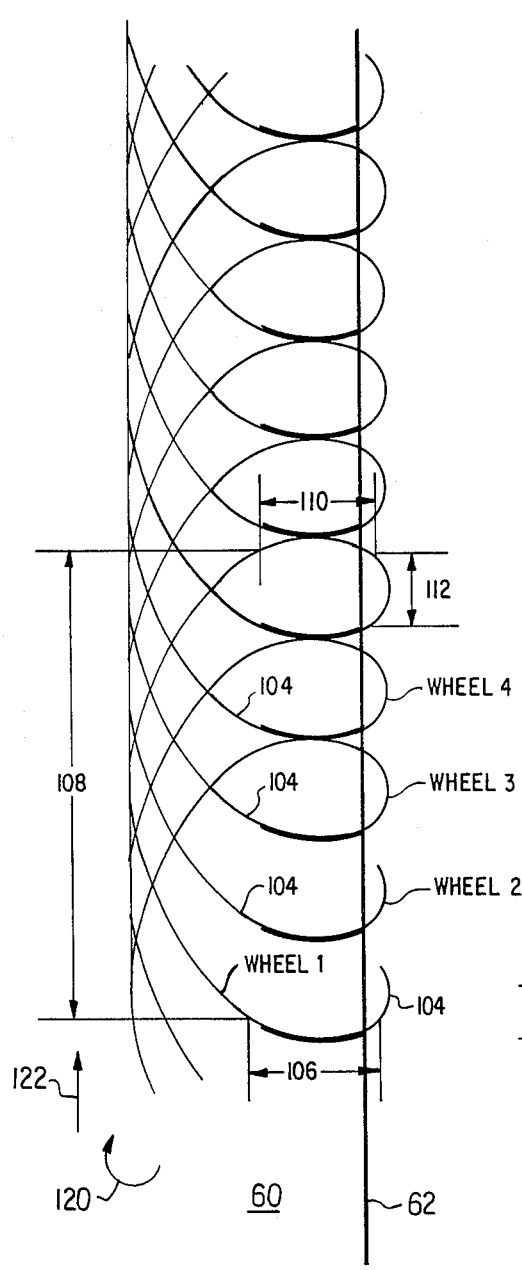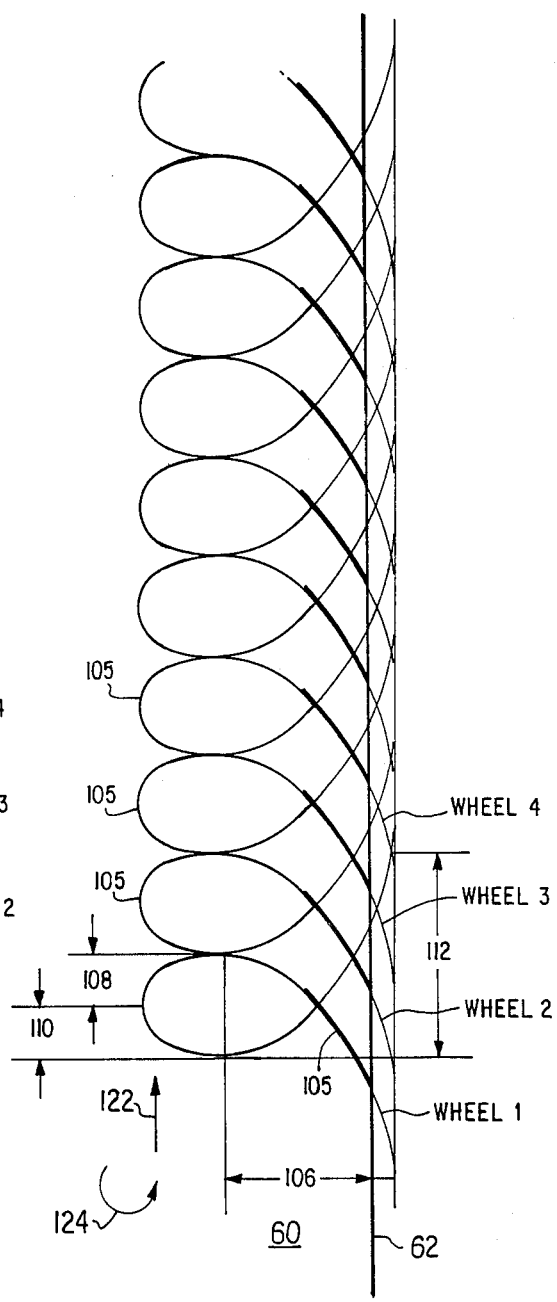

ROAD HAVING CURVED GROOVES

BACKGROUND OF THE INVENTION

This invention relates to an apparatus for the formation of transverse grooves in a road, more particularly for the formation of rain drainage grooves on the edges of the road. Transversely-extending grooves, i.e., grooves which are not parallel to the longitudinal axis of the road, are known. Generally, such grooves have been employed to define what is known in this art as rumble strips. Rumble strips may be defined by either a series of raised strips, often integral with the road surface, or by a series of transversely extending and parallel depressions, the latter being formed, conventionally, by a saw blade. The walls of sides of such grooves are thus generally vertical. The effect of the rumble strips is to generate noise and vehicle vibration when the wheels of an automobile pass over them to thereby apprise the driver that the vehicle is either to be slowed down or that the vehicle is not in a proper lane or not in a proper portion of the road.

Prior apparatus for making a series of transverse, parallel grooves in an already formed road has suffered the drawback of not being capable of operation in a continuous manner. Namely, whatever element is employed to form each groove is pushed down into the road surface, the groove is formed, the element is then raised from the road surface and then the element is advanced or indexed to thereby form the next adjacent groove by repeating the process. As noted above, the element is usually a saw blade.

SUMMARY OF THE INVENTION

According to the practice of this invention, the groove-forming apparatus can be moved continuously along a road, with a series of parallel, curved and transversely-extending grooves being formed in the road surface by means of a plurality of rotating cutting wheels, each wheel carrying a plurality of cutting teeth on its periphery. Each cutting wheel rotates about a substantially horizontal but slightly tilted axis, and is mounted on an axle. At the same time, each individual axle also rotates about a vertical but slightly tilted vertical axis. The plane swept out and defined by the axles is thus slightly tilted with respect to the road surface and is lower than the edge of the road. This combined motion is somewhat analogous to the rotation of the earth around the sun. Namely, the earth is rotating about its own (North-South) axis at the same time it is moving in a path around the sun. Four groove cutting wheels are angularly spaced ninety degrees from each other in the illustrated embodiment.

The apparatus is adjustably mounted on a vehicle, such as a truck, and is moved along the edge of the road. The axes of rotation of the cutting wheels are tilted somewhat to the horizontal. The motion of each cutting wheel, because of the tilt, causes the grooves cut in the road to be of maximum depth at the road edge and of zero depth a relatively short distance inwardly of the road edge. The contact between each cutting wheel and the road surface is about 90 degrees, or one fourth of the full rotation of each cutting wheel axis.

The grooves formed by the apparatus of this invention are deepest at the edge of the road, and then taper or slant to zero depth. The sides of the grooves are at an angle to the vertical, i.e., they are slanted or sloping.

My copending application Ser. No. 940,055 filed Dec. 10, 1986 describes a somewhat similar device for forming grooves in a continuous manner. There, the grooves are straight along their length, while in this invention, the grooves are essentially curved along their length, being defined and generated as arcs.

BRIEF DESCRIPTION OF THE DRAWINGS

FIG. 5 is a side view of a mounting arrangement for attaching the apparatus of this invention to a vehicle.

FIG. 6 is an exploded perspective view of FIG. 5.

FIG. 7 is a plan view showing the path of the cutting wheels as the apparatus advances along the right edge of a road, the direction of rotation of the axles carrying the cutting wheels being clockwise.

FIG. 8 is view similar to FIG. 7, but with the axles rotating counterclockwise.

DETAILED DESCRIPTION OF THE INVENTION

Figure 1:
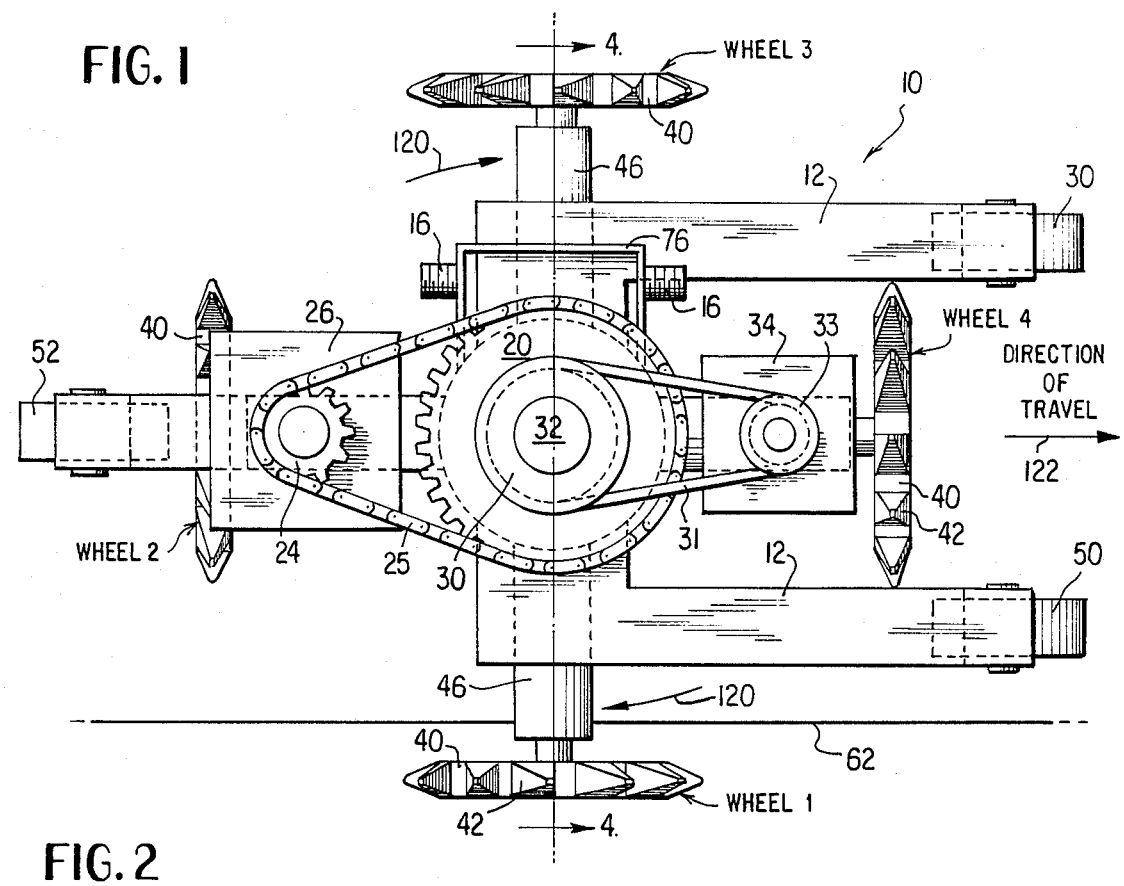
FIG. 1 is a top plan view of the apparatus of this invention.

Referring now to the drawings, the numeral 10 denotes generally the apparatus of this invention and includes a frame member 12. The frame member 12 is secured to a mounting bracket (to be described) and is adapted to be secured to an automotive vehicle, such as a truck, to thereby move the apparatus 10 along an already formed road which is to be provided with rain drainage/rumble strip grooves. The manner of affixing frame 12 on the truck forms no part of this invention, and will accordingly not be described.

Figure 2:
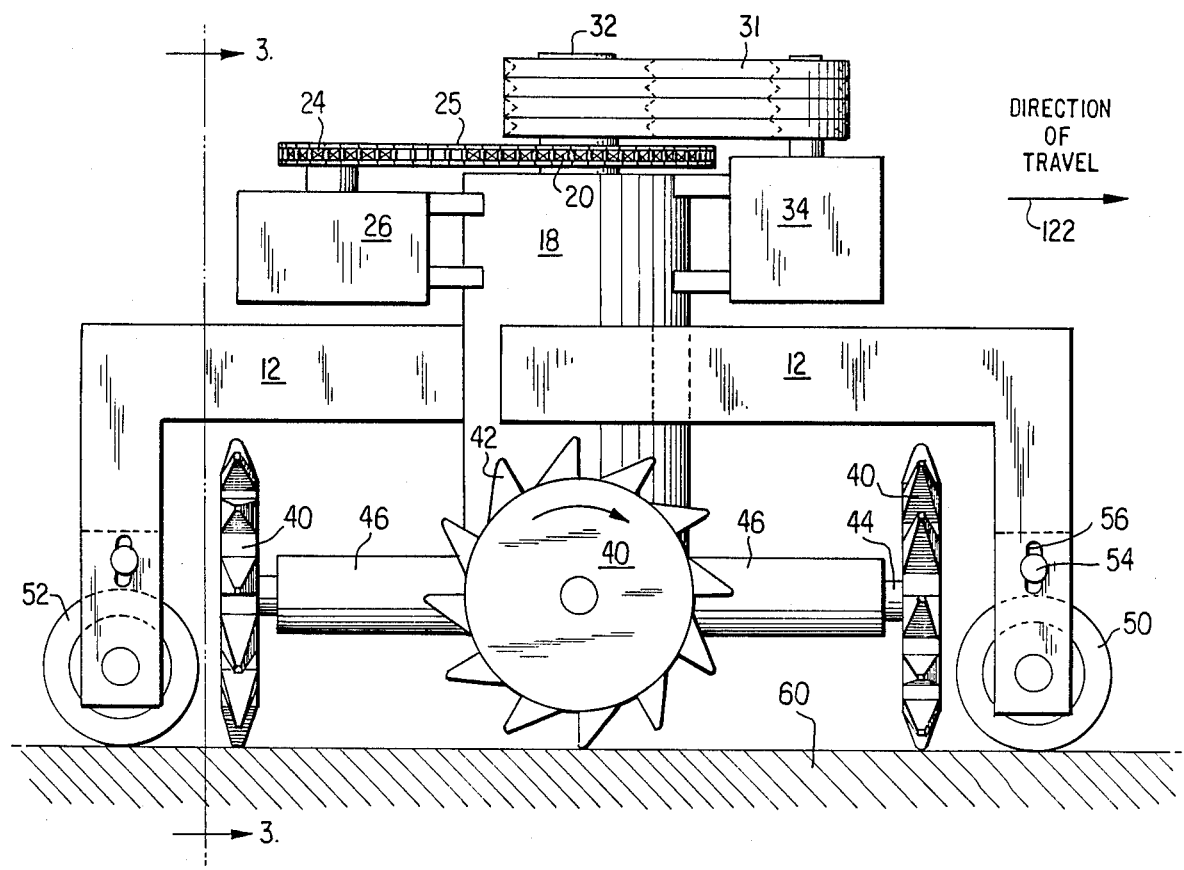
FIG. 2 is a side view of the apparatus of FIG. 1.

The numeral 18 denotes a portion of frame member 12, portion 18 being in the general form of a hollow cylinder. The numeral 20 denotes a generally horizontally disposed chain sprocket which is fixed to and adapted to rotate a cylinder 21 (see FIG. 4) within cylinder frame portion 18 to thereby rotate the horizontally extending shafts of the cutter wheels (to be described) about a generally vertical axis. The numeral 30 denotes a sheave to receive a plurality of V-belts 31. Rotation of sheave 30 causes rotation of shaft 32 (see FIG. 4) and the individual cutter wheels, shortly to be described. As shown at FIG. 2, hydraulic motor 26 is provided with a sprocket wheel 24 carrying ling chain 25 to drive sprocket wheel 20, while another hydraulic motor, denoted by the numeral 34, drives a sheave 33 which rotates, by means of belts 31, the described sheave 30. Power for the hydraulic motors 26 and 34 is conveniently derived from a pump carried on the truck (not illustrated), which carries the apparatus 10.

The numeral 40 denotes any one of the four cutter wheels, the periphery of each being provided with a plurality of cutting teeth 42, here shown as twelve in number. The cutting teeth 42 form grooves having sloping sides, as will soon be described. Each cutting wheel 40 is rotated on its own (horizontal) individual rotatable shaft on axle 44, with each axle 44 being positioned within and supported by a hollow arm 46. The radially innermost portions of arms 46 are integral with the lower portion of cylinder 21. The radially innermost portion of each of shafts 44 carries a bevel gear 45, with a single bevel gear 47 coupled to the lower end of shaft 32. Wheels 40 rotate on their own axles 44 as shaft 32 rotates with rotation of sheave 30 by virtue of the connection between bevel gear 47 and bevel gears 45. Sheave 30 is non-rotatably coupled to shaft 32.

The numeral 50 denotes either of two hard rubber front depth wheels, while the numeral 52 denotes a similar hard rubber rear depth wheel. The terms "front" and "rear" as applied to these wheels, refer to the direction of intended motion of apparatus 10 along the road, as indicated by the arrows at FIGS. 1 and 2 of the drawings. The front and rear depth wheels are attached to frame 12 and are vertically adjustable by virtue of a connection pin 54 slot 56 arrangement. The vertical setting of the depth wheels 50 and 52 determines the maximum extent of the depth of each groove cut by each cutting wheel 40 as it rotates about both its own axle 44 and about shaft 32.

Figure 3:
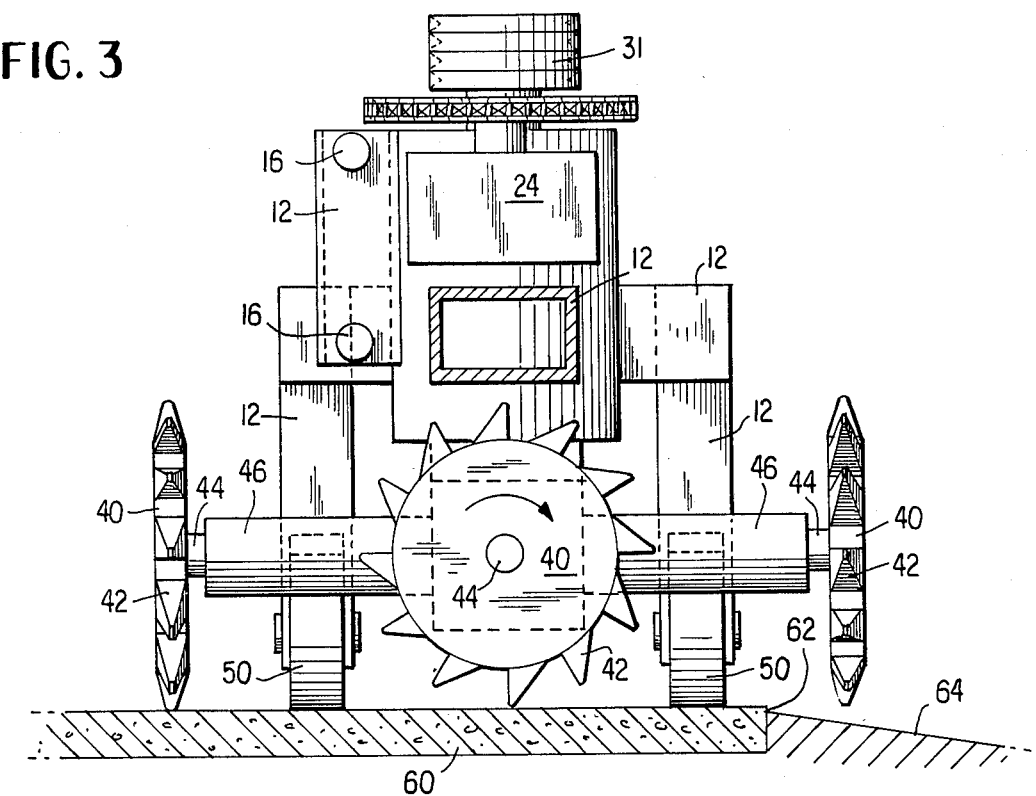
FIG. 3 is a view taken along section 3—3 of FIG. 2.

Each cutting wheel 40 travels along a circular path of rotation about shaft 32. If there were no forward motion of the apparatus 10 along the road, these four circular paths would be coincident. By adjusting wheels 50 and 52 so that housings 46 of FIG. 3 are tilted downwardly to the right, that cutting wheel which is rightward as seen in FIG. 3 and which is bottommost as seen in FIG. 1 will cut a groove from the road edge 62 towards the center of road 60. This groove will be of maximum depth at the road edge 62 and will taper in depth to zero depth towards the center of the road.

During operation, the apparatus 10 is coupled to a truck or other vehicle and moved along a road, in the direction indicated by the arrows at FIGS. 1 and 2. as shown at FIG. 3, the numeral 60 denotes the road, the right-hand edge only being shown, this edge being denoted by the numeral 62, with numeral 64 denoting the right road shoulder. The shoulder 64 is, where it meets the edge 62 of the road 60, lower than the edge of the road. Typically, the road 60 may be formed from concrete or asphalt. The plane swept out by axles 44 is tilted to the horizontal somewhat during operation. With hydraulic motors 26 and 34 in operation, and with movement of apparatus 10 along the road as described, the reader will observe that the cutting wheel 40 (see FIG. 3) which is to the right of the edge 62 of road 60 will cut into the roadbed 60 and, with continued rotation of housings 46 about shaft 32, and with continued forward movement along the road, a curved groove will be formed. The depth of penetration of cutting teeth 42 into the road diminishes with distance away from the edge 62 of the road because of the tilt of the plane of rotation of shafts 44 to the horizontal. As any one of the cutting wheels 40 is forming a groove, and passing from the edge of the road 62 towards the center of the road, a following or next adjacent cutter wheel 40 is rotating in the same direction (as it also rotates about its own axle (44). Thus, after any one wheel 40 has completed its cut or groove, its following cutter wheel cuts into road edge 62. Because the apparatus 10 is continually moving along the road, there will be a spacing between the commencement of one groove and the commencement of a next groove. The maximum depth of cut of each individual groove is determined and adjusted, for different depths, by means of wheels 50 and 52, as previously explained.

From the consideration of the above-described mode of operation, it will now be apparent that the number of cutting wheels may be varied without a departure from the practice of the invention. For example, if only a single cutting wheel 40 is employed, then the motion of the apparatus 10 in a forward direction along the road would necessarily be slower for the same spacing between grooves. As above noted, the central utility of the apparatus is to permit the continuous formation of grooves without stopping the truck which carries the apparatus in order to make the grooves. It will be apparent that the curvature of each individual groove will depend upon both length of shafts 44, as well as the forward speed of the vehicle along the road.

The direction of rotation of axles 44 and housings 46 about shaft 32 may be clockwise or counter-clockwise, as viewed in FIG. 1.

Figure 4:
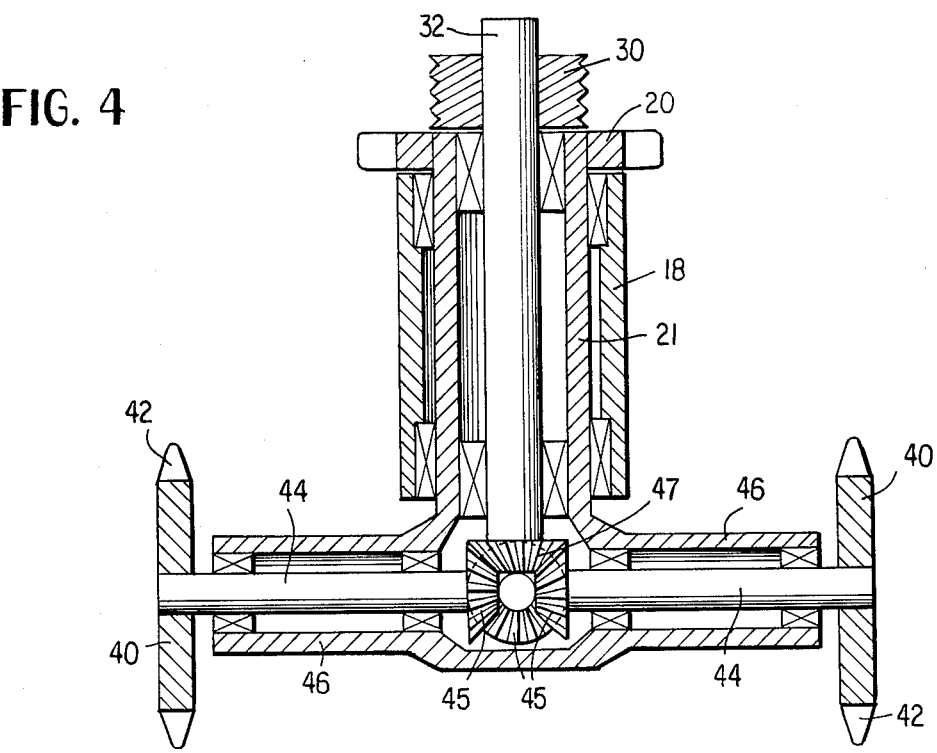
FIG. 4 is a view taken along section 4—4 of FIG. 1.

As seen from FIG. 4, for any given direction of rotation of vertically extending shaft 32, the direction of rotation of any right-hand cutting wheel 40, as it commences its cut into the road edge 62, will be the same. This follows by action of the drive of the shafts 44 from power input shaft 32 and bevel gears 45 and 47.

After the completion of the formation of grooves 140, they may be coated with a light-reflecting material or substance, such as paint laden with glass-reflecting particles or spheres. Rain will run off and thus not collect on the slanted walls of the grooves. The water will run off the groove sides and out of the groove bottoms to the road edge and onto the shoulder 64. Accordingly, the light-reflective material on the sides of the grooves is able to reflect back (retro-reflect) light from auto and truck headlights. Thus the grooves define a road edge boundary zone, visible to drivers, even during the rain and during darkness, for vehicular traffic. The grooves 140 also function to generate noise and vibration and thus give yet another indication to the driver of a vehicle of the location of the edge of the road. In this same connection, because the grooves 140 become gradually wider with nearness to the road edge 62, the vibration and noise (the rumble strip effect) produced becomes greater as a vehicle approaches the road edge 140. The slant of the reflectively coated groove walls, permitting retro-reflection of vehicular headlights, and the varying groove width yields a combined road edge delineation and rumble strip effect not heretofore known. In addition, when there is glare on the road surface from oncoming headlights or from other illumination, a series of shadow depressions will be seen by the motorist, denoting the edge of the road.

Referring now to FIGS. 5 and 6, a U-shaped metal bracket 76 is welded to cylindrical portion 18, the sides of bracket 76 carrying threaded pins 16. Another bracket 80 is provided with openings 82 to receive the upper pins 16, the lower pins 16 received in a respective slot 84 of bracket 80. A third bracket 96 reinforced by webbing, carries a threaded pin 90 received by opening 88 of bracket 80, with threaded pins 92 received by slots 86. A beam 98 attached to a truck (not shown) receives bolts 100 to secure bracket 96 to the beam. By varying the positions of pins 92 and lower pins 16 relative to their respective slots, the tilt of cylinder 18 can be varied. In this way, the tilt of the plane of rotation of the axles 44 about shaft 32 can be varied, to thereby provide an independent manner of tilting said plane of rotation.

It will be seen that each cutting wheel 40 rotates with its respective axle 44, each axle 44 rotating about its own longitudinal axis. Simultaneously, each axle 44 rotates about shaft 32 with shaft 32 being at right angles with each shaft 44. The shaft 32 is nearly vertical, with the mounting arrangement shown at FIGS. 5 and 6 permitting a desired degree or amount of tilt of shaft 32 from the vertical. In practice, the tilt from the vertical of shaft 32 is in the range up to about 10 degrees.

Referring now to FIG. 7 of the drawings, a plan view of a part of the road is shown, with numeral 60 indicating the road and numeral 62 denoting an edge of the road. The path of each of the four cutting wheels 40 is illustrated in its relationship to the illustrated portion of the road. As shown at FIG. 1, the direction of rotation of gear wheel 20 and axles 44 is clockwise as denoted by the curved arrow 120 at FIG. 7. Wheel 1, rotating about its own axle 44, is moving towards the road from a position ouside of the edge 62 thereof. Contact with the cutting teeth 42 of wheel 40 is then made with the edge of the road, and this contact continues over an arc length shown by the heavy portion of path 104.

The numeral 106 denotes one of the four quadrants traversed by wheel 1 in any given revolution of its axle 44 about the axis of shaft 32. The numeral 108 denotes the second quadrant, the numeral 110 denotes the third quadrant, while the numeral 112 denotes the fourth quadrant. This cutting action continues while the cutting teeth 42 are in contact with the road. Because of the slight tilt of the plane defined by the rotating axles 44, the cutting teeth 42 of wheel 1 will rise above the road surface at the end of first quandrant 106. As the vehicle which carries apparatus 10 is moved down the road, in a direction indicated by arrow 122 of FIG. 7, wheel 1 will move in a second quadrant for an angular or arc length denoted by the numeral 108. When wheel 1 reaches the end of second quadrant 108, it enters into third quadrant 110, and in this quadrant is moving downwardly towards the road edge 62 somewhat. In fourth quadrant 112, the wheel 1 is still moving down somewhat, while at the very end of fourth quadrant 112 and at the beginning of first quadrant 106, the wheel 1 is now moving slightly upwardly relative to the surface of the road.

Each of the remaining three wheels similarly describe paths 104 identical to path 104 described by wheel 1. Were it not for the linear motion 122 of the apparatus 10 along the road, each path 104 for each of the cutting wheels 40 would be a circle. It is the combination of the circular motion of each cutting wheel about the axis of shaft 32 and the linear motion 122 which gives rise to paths 104.

Referring now to FIG. 8 of the drawings, the paths 105 for the cutting wheels 40 are similarly illustrated, except that the direction of rotation of gear wheel 20 and axles 44 about the axis of shaft 32 is now counterclockwise, as indicated by the curved arrow 124 at FIG. 8. In the first quadrant 106, cutting wheel 1 is moving towards edge 62 of the road and it is moving slightly upwardly. Contact with the road surface is made to form a groove, and this groove cutting action continues until wheel 1 has moved about the surface of the road 60. Again, this cutting contact of each cutting wheel 40 with the road surface is indicated by the heavy portion of path 105. Sometime later, this wheel enters second quadrant 108, then third quadrant 110 and finally fourth quadrant 112. Each of the remaining three wheels executes or describes a similar path 105.

Figure 9:
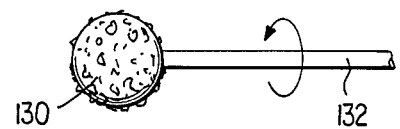
FIG. 9 is a view showing a rotating cutting element in the form of an abrasive sphere.

Referring now to FIG. 9, an abrasive covered hard ball, such as a metal ball coated with an abrasive, is denoted by 130 and is secured to and rotates about the longitudinal axis of shaft 132. A corresponding shaft 132 and ball 130 may be substituted for each axle 44 and cutting wheel 40 of FIGS. 1–4.

Figure 10:
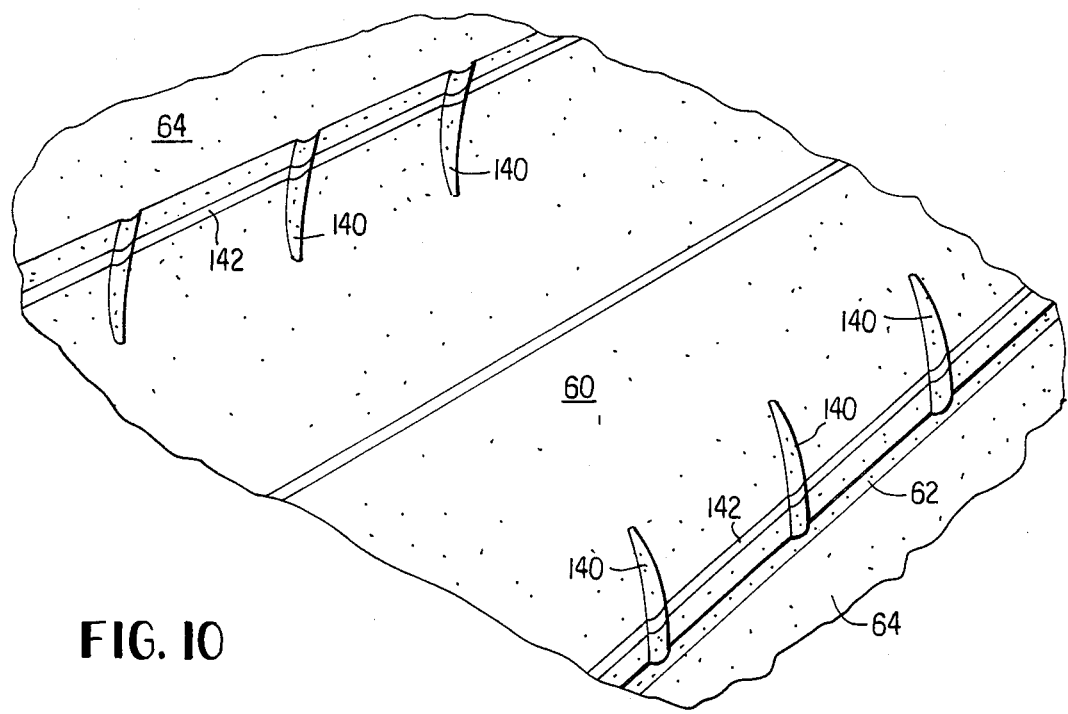
FIG. 10 is a perspective view showing a road segment provided with grooves formed by the action indicated at FIG. 8.

FIG. 10 illustrates a road provided with grooves 140 at its edges, a continuous reflective stripe 142 extending alog each road edge and extending into a portion of each groove. The grooves 140 correspond to the heavy or thickened arcs of paths 105 of FIG. 8 and it will be understood that corresponding grooves made by the process described in connection with FIG. 7 would be similar, but would be of a shape, in plan view, as that shown by the heavy or thickened arcs of paths 104 of FIG. 7.

Figure 11:
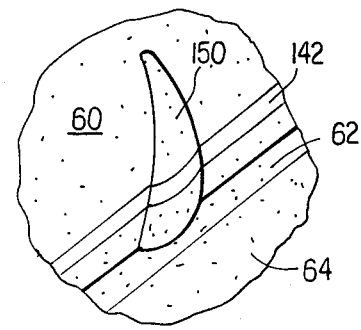
FIG. 11 is a partial view of a single groove formed from the cutting sphere of FIG. 9.

FIG. 11 is similar to FIG. 10, but illustrates a groove 150 (similar to grooves 140) made by abrasive ball element of FIG. 9. Typically, the lengths of grooves 140 and 150 are in the range of eight to eighteen inches and their maximum depth being about three-fourths inch. The distance between the road edge 62 and the outside edge of reflective line 142 is normally about two inches. Reflective stripe 142 is normally four inches or more in width. The shallow end of each of the grooves 140, 150 extends a few inches beyond the inner edge of stripe 142 so that stripe 142 will cover a depressed region of each groove.

It will be seen that the grooves 140,150 are of an extent, relative to the road width, less than one-half of the width of the road.

While disclosed as exhibiting particular utility for the cutting of grooves along the side of a road, the apparatus 10 may also be employed for cutting grooves in a raised marking strip, such as that described in my U.S. Pat. No. 4,575,278.

Additionally, more than one apparatus 10 may be used simultaneously, cutting in the same direction or cutting in opposite directions and need not be directly behind each other. Also, this apparatus may be utilized as a roto-mill for notching out asphalt roads prior to overlay, as well as for cutting out road bumps.

The cutting action indicated by the heavy shaded portions of paths 104 and 105, in FIGS. 7 and 8 respectively, occurs in the first quadrant 106. The apparatus 10 has been tilted such that the plane swept by axles 44 is not horizontal. In the cutting action of FIG. 7, the tilt is such that the top of shaft 32 extends upwardly towards the viewer and is tilted both downwardly and to the left, as viewed with respect to FIG. 1. In the cutting action of FIG. 8, the tilt is such that the top of shaft 32 extends upwardly towards the viewer and is tilted downwardly and to the right, as viewed with respect to FIG. 1. In the groove cutting operation depicted at both FIGS. 7 and 8, each cutting wheel 40 first contacts the edge of the road and then moves towards the road interior.

It will be understood that the tilt of the plane swept by axles 44 can be adjusted such that cutting wheels 40 can engage and cut the road surface in any one or more adjacent quadrants, and will cut in all four quadrants if the tilt is zero with respect to the road surface.

Though not practical for major roto-milling (removal of top layer of road surface) of entire roads prior to resurfacing, this apparatus may be used for emergency or minor grinding or milling. The tilt of the apparatus may be adjusted so that the apparatus is parallel to the road surface and thus could cut simultaneously in all four quadrants. Or, if rumble grooves are required in the middle of the road or in the area of a road lane line, then the tilt of the apparatus may be adjusted to cut in the first and second quadrants (or third and fourth quadrants) so that a regular series of grooves will form a lane line in the road. The width of the cutting teeth on the cutting wheels, and the cutting wheels themselves, may be changed to yield grooves of wider or narrower widths to vary the intensity of the rumble effect. Likewise, the diameter of the cutting sphere may be changed to yield different depths and widths to the grooves.

What is claimed is:

1. A road rumble strip construction including a road having a shoulder below an edge of the road, a plurality of grooves each of which intersects said road edge and each of which has portions which extend into the road surface, each of said grooves being arcuate in plan view of said road, each of said grooves being of continuously varying depth along its length, the deepest portion of each groove being located at an endge of the road, said grooves being parallel to each other and being at an angle to the longitudinal axis of the road, the end of each groove opposite its deepest portion terminating at and being coplanar with the surface of the road, the grooves being formed from the road and being integral with the road, the extent of the grooves at each edge of the road, relative to the road width, being less than one half of the width of the road.

2. The road rumble strip of claim 1 wherein at least a portion of the sides of said grooves are coated with a retro reflective coating, the bottoms of the grooves being slanted downwardly towards said road edge, the groove bottoms adjacent said road shoulder being even with or above said shoulder, whereby rain water will run off the sides of the grooves and out of said groove bottoms to said road edge and onto said shoulder, to thereby maintain said retro reflective coating free of rain water so that said coating will be visible to motorists during hours of both darkness and rain, and whereby when glare on the road is present, a series of shadow depressions will be seen by the driver of a vehicle moving along the road.

3. A method of cutting a groove in a road, the method including the steps of rotating a cutting element about its own axis, simultaneously rotating the cutting element about a nearly vertical axis, while it is rotating about is own axis, said nearly vertical axis being spaced from the cutting element as measured in a generally horizontal direction, also translating said nearly vertical axis in the direction of the road, the cutting element engaging the road to cut an arcuate groove of continuously varying depth therein.

4. A method of cutting a groove in a road, the method including the steps of rotating a cutting element about its own axis, simultaneously rotating the cutting element about a nearly vertical axis, while it is rotating about its own axis, said nearly vertical axis being spaced from the cutting element as measured in a generally horizontal direction, also simultaneously translating said nearly vertical axis in the direction of the road, the cutting element engaging the road to cut an arcuate groove of continuously varying depth thereon.

5. An apparatus for cutting grooves in the surface of a road, at least one rotary cutting element attached to an axle, means for causing the rotation of said axle about its own longitudinal axis to thereby rotate said cutting element, means for simultaneously rotating said axle about a second axis at right angles to said longitudinal axis, means for varying the tilt of said second axis, said second axis being substantially vertical, whereby as the apparatus is moved along a road, said cutting element will cut an arcuate groove in the road, the groove being at an angle to the longitudinal axis of the road.

6. The apparatus of claim 5 including a plurality of said rotary cutting elements each carried on its own axle, whereby each cutting element will cut a respective groove in the road.

7. The apparatus of claim 5, including means carried by the apparatus for limiting the maximum depth of a groove cut into the road surface by said cutting element.

8. The apparatus of claim 5 wherein said rotary cutting element is a toothed wheel.

9. The apparatus of claim 5 wherein said rotary cutting element is a sphere having an abrasive surface.

* * * * *